United States Patent [19]

Shetley

[11] Patent Number: 5,336,396
[45] Date of Patent: Aug. 9, 1994

[54] WASTE OIL MANAGEMENT SYSTEM

[76] Inventor: Michael C. Shetley, 2100-C Cove Lane, N. Palm Beach, Fla. 33408

[21] Appl. No.: 38,710

[22] Filed: Mar. 29, 1993

[51] Int. Cl.⁵ .......................................... B01D 35/147
[52] U.S. Cl. ....................................... 210/90; 210/171;
    210/172; 210/195.1; 210/253; 210/257.1;
    210/258; 210/416.4; 210/912; 123/575
[58] Field of Search ............... 210/90, 171, 172, 195.1,
    210/253, 257.1, 258, 502.1, 912, 416.4, 500.1;
    123/196 S, 575

[56]   References Cited
       U.S. PATENT DOCUMENTS

| | | | |
|---|---|---|---|
| 3,915,860 | 10/1975 | Priest | 210/136 |
| 4,095,571 | 6/1978 | Fleetwood et al. | 123/575 |
| 4,192,750 | 3/1980 | Elfes et al. | 210/253 |
| 4,253,819 | 3/1981 | Jorel | 431/208 |
| 4,338,189 | 7/1982 | Johnson | 210/180 |
| 4,354,946 | 10/1982 | Warlick | 210/774 |
| 4,360,436 | 11/1982 | Poveromo | 210/172 |
| 4,413,604 | 11/1983 | Tune | 123/575 |
| 4,417,561 | 11/1983 | Yasuhara | 123/196 S |
| 4,604,205 | 8/1986 | Ayers | 210/502.1 |
| 4,629,558 | 12/1986 | Garritty | 210/130 |
| 4,846,967 | 7/1989 | McGehee | 210/257.1 |
| 4,997,555 | 3/1991 | Church | 210/136 |

FOREIGN PATENT DOCUMENTS 50439  4/1980  Japan .................. 210/502.1

Primary Examiner—Matthew O. Savage
Attorney, Agent, or Firm—McHale & Slavin

[57]   ABSTRACT

A fuel management system for blending of an alternative fuel such as waste oil with a conventional fuel and the continuous filtration thereof before delivery to fuel injection system of a conventional diesel engine. The system attaches to the storage tanks of a heavy duty truck using a proportioning device for withdrawing of the fuels from their respective tanks before blending by use of an air operated diaphragm transfer pump. The blended fuel is continuously recirculated through at least one fiberglass filter with a device for metering the final flow to the injection system and the remainder to the storage tanks. The system can remove up to 99.5 percent of the heavy contaminants found in the diesel fuel and alternative fuels.

15 Claims, 2 Drawing Sheets

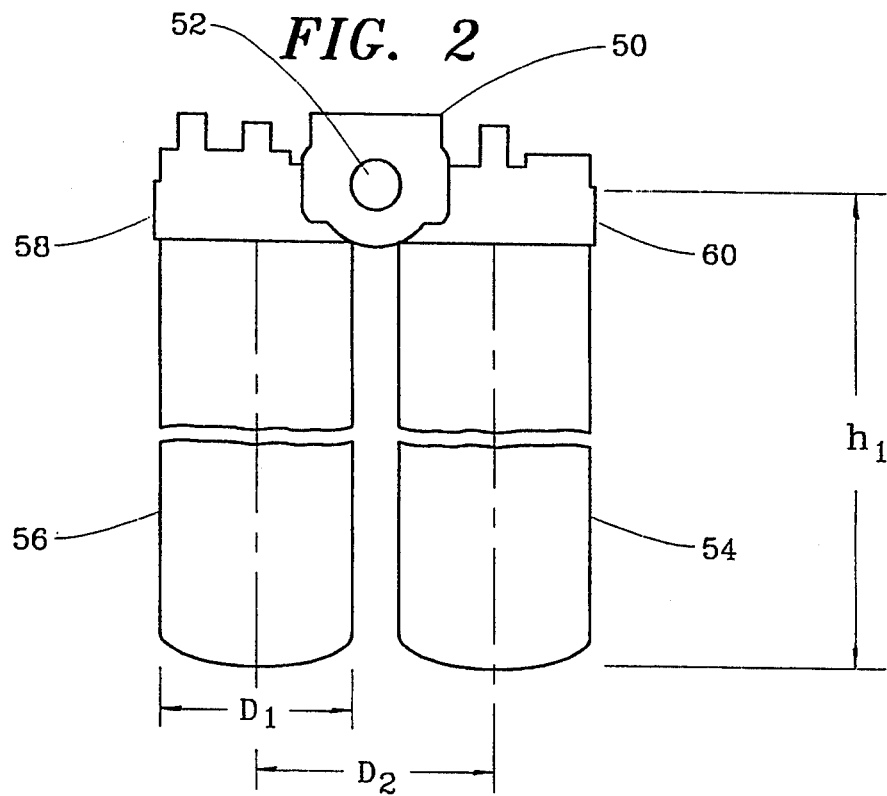
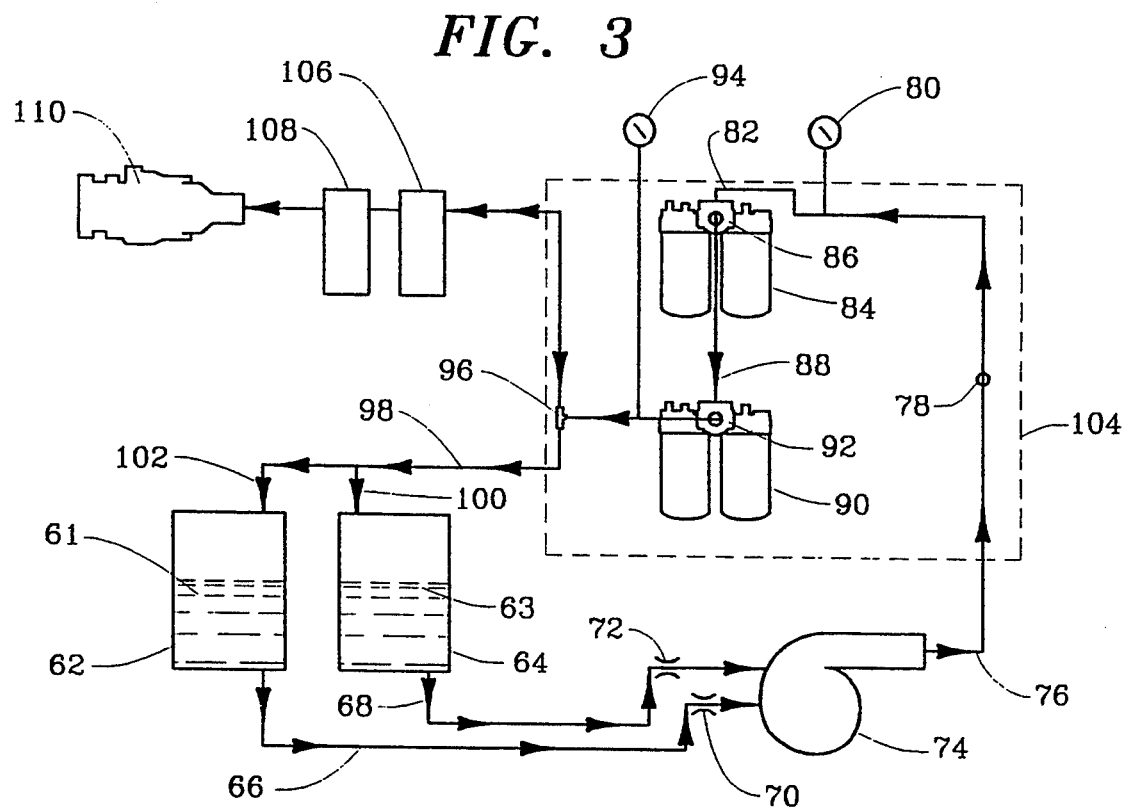

WASTE OIL MANAGEMENT SYSTEM

FIELD OF THE INVENTION

The present invention relates generally to field of filtration and, more particularly, to a waste oil management system for diesel engines which permits the use of alternative fuels for diesel engines.

BACKGROUND INFORMATION

Filtration of diesel fuel is well known in the art. The ideal fuel filter provides infinite restriction to the passage of particulates, removal of sediment, removal of water, exhibits zero resistance to fluid flow, and provides unlimited capacity for retaining contaminants. An actual filter cannot exhibit such phenomenal performance and the manufacturer of fuel filters must establish a balance between filter capacity and efficiency.

Conventional filtration of diesel fuel is performed by placing a micro-porous filter membrane between the fuel storage tanks and the fuel injection system wherein the filter traps various impurities. Diesel engines are especially sensitive to impurities and are the prime source of injection system problems. During transportation, transfer, and storage of fuel, impurities can be introduced in a number of ways including condensation. For instance, water combines with other contaminants of diesel fuel and encourages microbiological growth which generates orifice and filter restricting sludge. Contaminated water corrodes and erodes injection nozzles causing spray patterns preventing proper fuel atomization.

In systems where water and fuel pass through high shear pumps, fuel/water interfacial tension is relatively low, and settling time is minimized, fine emulsions may predominate. In systems where water enters before or after low shear pumps, or where there is a prolonged settling time in high interfacial tension fuel, larger water droplets may predominate. In some systems, both fine emulsions and large droplets may be present simultaneously. For these reasons, the primary focus of conventional diesel fuel filtration systems is directed toward the removal of water with an ancillary benefit of removing larger particles.

The more contaminants within the diesel fuel the more prone the fuel injection systems are prone to failure. Current fuel injection systems can operate on commercial available diesel fuel but injection of waste oil into the close tolerances of the injection systems will cause more harm than the aforementioned water induction and literally invites disaster. Waste oils typically have sediment, sulfur, heavy metals such as iron, chromium, lead, copper, tin, aluminum, nickel, silver, manganese, as well as water making the oil suitable only for disposal. These oil contaminants can cause wear, gumming, corrosion, and rust in a fuel system. Combined with water, compounds such as sulfur makes the fuel acidic, which enhances corrosion in fuel injection systems as well as in the engine itself. The chemistry of the waste fuel itself, additives and surfactants, will determine what form the impurity takes.

Unique to the instant invention is the ability to use alternative fuels such as waste oil in a conventional fuel system. The prior art fuel systems include a primary sediment trap for larger particles and a paper filament filter to trap smaller particles and water by separation and/or absorption. In extreme situations a centrifugal pump is used to disperse water in the fuel. The introduction of waste oil into such a prior are fuel system will cause the paper filter and injector to quickly clog. The use of larger paper filters will not remedy the situation as the waste oil will contaminate the paper defeating the filters ability to separate or absorb water.

Therefore, what is lacking in the art is a fuel filtration system that is capable of managing alternative fuels such as lubricating oils, hydraulic oils and the like for their introduction into a conventional fuel system.

SUMMARY OF THE INVENTION

The present invention satisfies the aforementioned needs by teaching a waste oil management system designed particularly for heavy duty diesel trucks having a pneumatic system. The system draws fuel from conventional dual mounted fuel tanks into an air operated diaphragm pump. Each fuel tank has a separate inlet to the air pump for proportioning the amount of fuel delivered. The shearing action of the air pump blends the two fuels into a predetermined mixture. The blended fuel is then transferred to at least one specialty filter, or two filters in a parallel arrangement for the majority of applications which employ a die cast head with an inlet and outlet port for interconnection with the fuel systems. The filtration unit may be mounted at any convenient location on the truck, preferably directly behind one of the fuel tanks along a side rail. The location allows the use of short suction lines and return lines, and permits servicing without entering the engine compartment. A box can be employed to protect the filtration system from the environment.

Each filter includes two internally mounted pressure relief valves and an oversized inlet and outlet to reduce flow restriction. Unlike conventional fuel filters which use paper filaments for removal/absorption of emulsified fluids, the filtering element of the instant invention is constructed of fiberglass. The fiberglass element will not separate or absorb fluids and is designed primarily for the reduction of heavy metals and the like contaminants.

The outlet of the cartridge filtration is divided into a low pressure line directed to the engine injectors at approximately 7 psi, and a high pressure line directed to the storage tanks for recirculation at approximately 23 psi. The injection line introduces the now blended and filtered fuel oil into the system for final filtration, using fiberglass filters in place of existing paper filter elements. The fiberglass filters provide a final polishing and will allow water to pass through the filters which, when water is in a purified state, clean the carbon from engine cylinders.

By use of the inventors waste oil management system a conventional fuel reservoir, having two 60 gallon fuel cells, will be filtered every ten minutes or less if the transfer pump is rated for 13 gallons per minute. The continuous filtration prevents storage tank stagnation and continuously filters the fuel into higher and higher qualities for consistent removal of 99.5% of the incoming contaminants. The filtration permits the blending of waste oils otherwise destined for disposal thereby allowing the operator to use a lower cost fuel source to offset the higher cost of purified diesel fuel. In addition, once filtered, the waste oil is a better source of fuel as it provides a higher BTU rating and provides system lubrication. Water present in the fuel is purified allowing for injection.

Accordingly, a primary object of the present invention is to provide a waste oil management system that allows the use of alternative fuels in a conventional fuel system.

Another object of the present invention is to provide a process capable of utilizing previously discarded oil to produce a higher grade fuel than commercially available diesel fuel by providing a higher BTU rating and further providing an increase in lubrication to the injection systems.

Still another object of the present invention is to provide a filtration system using a fiberglass filter that will not clog from emulsified fluids and allows fuels such as diesel and the fuel oil to remain in solution.

Yet still another object of the present invention is to provide a recirculation system that will continuously filter the fuel during operation providing a blended fuel from 5 percent up to 85 percent waste oil blends.

Still another object of the present invention is to provide a filter element designed to remove heavy metals namely, iron, chromium, lead, copper, tin, aluminum, nickel, silver, manganese, from the fuel oil.

Another object of the present invention is to provide a system for removing contaminants from water present in the fuel allowing water injection to benefit the fuel injection system.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2 is a side view illustrating two filters placed in a parallel arrangement; and FIG. 3 is a flow diagram of the waste management system of the instant invention.

DETAILED DESCRIPTION

Figure 1:
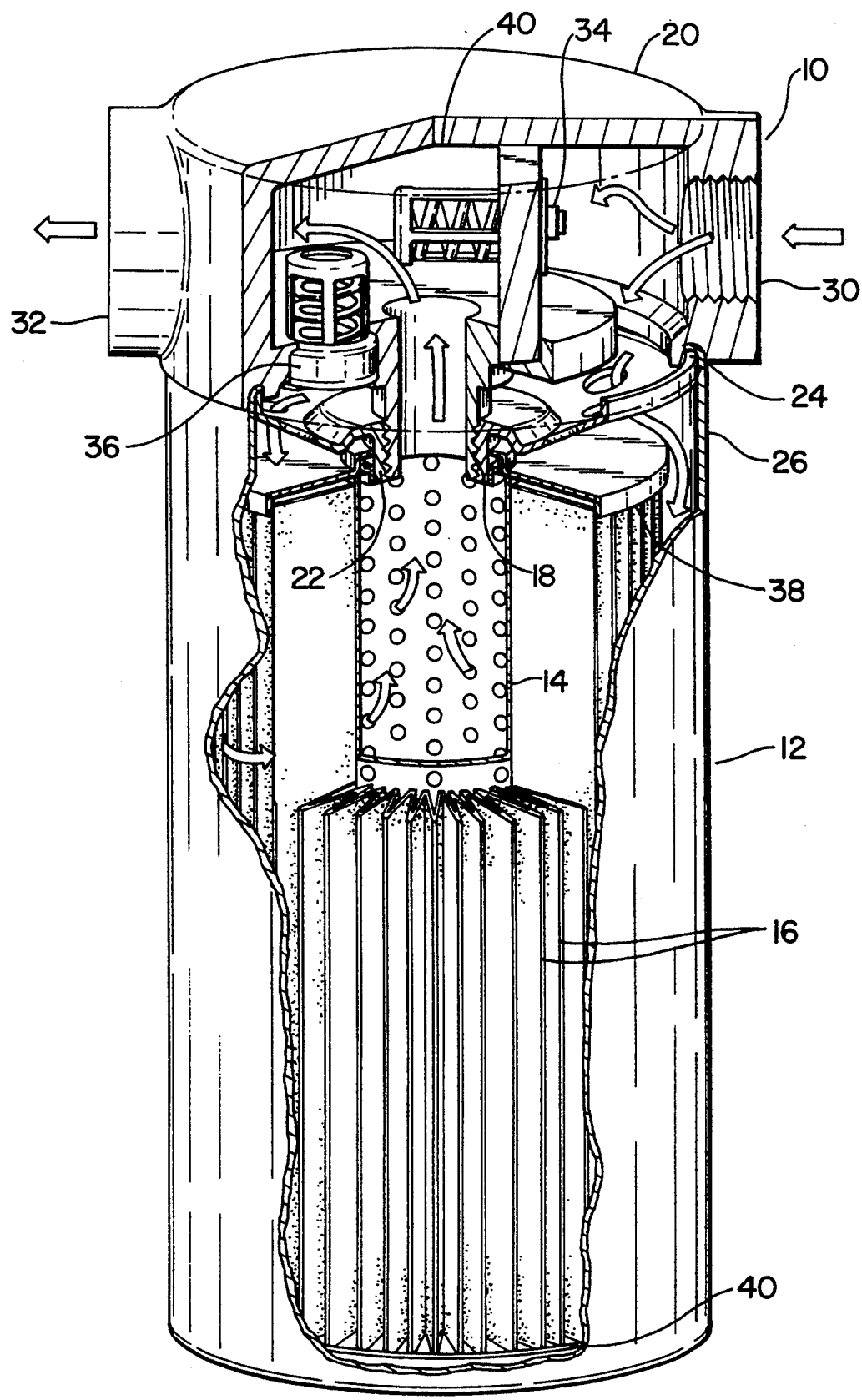
FIG. 1 is a perspective view illustrating a single filter cartridge of the present invention.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Now referring to FIG. 1, shown is a single filter 10 which forms the basis of the instant invention. The filter 10 includes a disposable, spin-on cartridge housing 12 having a perforated center support pipe 14 with a pleaded fiberglass filter 16 attached thereto. The support pipe 14 includes threads 18 for engagement to a filter head 20 having a male threaded portion 22. The cartridge housing 12 utilizes an annular gasket 24 predisposed on the outer peripheral 26 of cartridge housing 12.

The filter head 20 includes an oversize 1½ inch threaded inlet 30 and a 1½ inch threaded outlet 32 for minimum flow restriction of higher viscosity oils. A first spring loaded pressure relief valve 34 provides cartridge bypass in case of inlet restriction such as incorrect cartridge installation. In addition, a second spring loaded pressure relief valve 36 provides filter bypass in case of filter element blockage. Pressure tap 40 located on the outlet flow of the filter head 20 allows mounting of a pressure gauge or electrical sensing pressure switch.

In operation the fuel enters the filter head 20 via the oversized inlet 30 and into the cylindrical casing of the cartridge 12 wherein fuel is allowed to surround the fiberglass element 16. It should be noted that, contrary to conventional fuel system filtration teachings, the fiberglass filter 16 provides selective non-fluid contaminant reduction of sediment, heavy metals, and particulates. It should be noted that the heavy metals removed by the filter are in particulate, non-ionic form. Use of a pleaded fiberglass filter element provides additional surface area for contaminant removal and the micron rating of the filter is preferably less than 25 microns for optimum particle removal. Actual micron rating is dependant upon the environment the engine will encounter and the type of alternative fuel likely to be encountered.

If an improperly sized cartridge housing 12 is secured to the head, total blockage may occur wherein the first relief valve 34 will open to provide cartridge housing bypass. It is desirable to have the first relief valve 34 open at pressures above 25 psi allowing the installer to instantly determine improper cartridge installation. Proper cartridge attachment allows the fuel to surround the element 16 which is an annulus or loop of pleaded fiberglass similar to a filter used in the food processing industry. The filter element 16 is housed between upper end cap 38 and lower end cap 40 each of which comprise generally circular sheet metal plates for supporting the filter structure. Both of the end caps 38 and 40 include circular ridges at the outer peripheral thereof which extend inwardly to further contain the filter element 16. The fuel oil passes through the filter into the perforated central support pipe 14. If the filter element 16 is clogged, the second relief valve 36 allows fuel bypass at pressures above 15 psi. Fuel oil that passes into the perforated support pipe 14 is directed outwardly from the oversized outlet 32.

Now referring to FIG. 2, shown is a two cartridge assembly having a single mounting head 50. The twin mounting head 50 replaces the aforementioned single mounting head allowing additional filter surface area with less restriction suitable for the majority of diesel engine applications. The twin mounting head includes, as previously mentioned and incorporated herein, dual relief valves together with the oversized 1½ inch inlet and outlet. The fuel enters the filter head 50 via the oversized inlet 52 and is directed into the parallel placed cartridge heads 58 and 60 for introduction in cartridge housings 54 and 56 respectively. The preferred embodiment uses a cartridge diameter D1 of approximately 5 inches with a separation between the centerline D2 of dual mounted cartridges of 6 inches. Regular cartridge height Hi is approximately 8½ inches and a larger 12½ inch cartridge is available for extended operation by providing greater filter surface area and capacity.

FIG. 3 sets forth a flow diagram of the fuel management system of the instant invention. By the blending of alternative fuels with a conventional fuel and the continuous filtration thereof, waste oils are properly conditioned before delivery to the fuel injection system of a conventional diesel engine. In accordance with the system, a first storage means 62 or tank is used to store conventional diesel fuel 61 and a second storage means 64 or tank is used to store alternative fuel 63 such as waste oil. The first tank uses a transfer line 66 having a fixed diameter 70 for proportioning fuel flow or a flow restricting device allowing a predetermined amount of fuel 61 to be drawn from the tank 62. In addition, the second tank uses a transfer line 68 of a fixed diameter 72 for proportioning oil flow or a flow restricting device allowing a predetermined amount of oil 63 to be drawn from the tank 64.

A self-priming air operated diaphragm pump 74 transfers the fuel 61 and oil 63 via suction thereafter blending the fuel oil within the pump 74 pressurizing chamber providing a pressurized blended fuel. The air diaphragm pump is a low shear pump having a high interfacial tension which can replace the conventional fuel pump, or alternatively, provide a supplemental pumping means to the existing pump. The air pump operates off the existing air compressor system found on truck tractors. The fuel is transferred through a feed line at a variable delivery rate 78 of approximately 30 psi by means of a manual air line regulator placed in the air supply line to the diaphragm pump 74. Actual pressure rates can be monitored by an in-line pressure gauge 80. Low pressure rates at this point indicate air pump malfunction.

The blended fuel is directed to the inlet 82 of the aforementioned fiberglass filtration means shown here as a spin-on disposable canister cartridge 84 placed in parallel with a second spin-on canister cartridge 84 by means of a single die cast header 86, the outlet of which is directed to the inlet 88 of a second spin-on disposable canister cartridge 90 by means of a single die cast header 94 for a series-parallel arrangement. Although the inventor has found that the placement of dual filters in a parallel arrangement provides sufficient filtration, it is recommended that extremely dirty conditions employ four filters in the series-parallel arrangement shown. The fiberglass filters are designed to remove 99.5% of the heavy contaminants found within the blended fuel.

Test performed by an independent laboratory provided the following results, Example 1 is the alternative fuel taken from an unfiltered storage tank, Example 2 and 3 are two different alternative fuels taken from an unfiltered storage tank that includes a transfer filter. All tests performed by an independent laboratory.

| EXAMPLE 1 (UNFILTERED FROM STORAGE) | | |
|---|---|---|
| | Alternative Fuel (before) (Lab Test #61312) | Filtered Fuel (after) (Lab Test #11045) |
| Fe | 97 | 19 |
| Cr | 5 | 0 |
| Pb | 121 | 25 |
| Cu | 55 | 35 |
| Sn | 2 | 0 |
| Al | 37 | 24 |
| Ni | 3 | 0 |
| Ag | 0 | 0 |
| Mn | 0 | 0 |
| Particles | 54,176,000 | 13,748,000 |

| EXAMPLE 2 (FILTERED FROM STORAGE) | | |
|---|---|---|
| | Alternative Fuel (before) (Lab Test #15807) | Filtered Fuel (after) (Lab Test #19415) |
| Fe | 67 | 12 |
| Cr | 8 | 4 |
| Pb | 71 | 14 |
| Cu | 39 | 9 |
| Sn | 4 | 1 |
| Al | 12 | 4 |
| Ni | 0 | 0 |
| Ag | 0 | 0 |
| Mn | 0 | 0 |
| Particles | 6,260,800 | 1,102,400 |

| EXAMPLE 3 (FILTERED FROM STORAGE) | | |
|---|---|---|
| | Alternative Fuel (before) (Lab Test #19913) | Filtered Fuel (after) (Lab Test #24122) |
| Fe | 27 | 19 |
| Cr | 4 | 4 |
| Pb | 30 | 19 |
| Cu | 17 | 18 |
| Sn | 1 | 4 |
| Al | 9 | 4 |
| Ni | 0 | 2 |
| Ag | 0 | 0 |
| Mn | 0 | 0 |
| Particles | 6,660,800 | 1,544,500 |

A second pressure gauge 94 is mounted downstream from the filter system providing a means for determining filter replacement. A pressure differential greater than 10 psi between the inlet and outlet pressure gauges indicates the need for filter replacement. A metering means 96 based on pressure provides a low pressure, about 7 psi, directed 97 to the fuel injector 110 and the remaining fuel under pressure, approximately 23 psi, directed 98 to the inlet 100 of storage tank 64 and inlet 102 of storage tank 62. The return of the blended and now filtered fuel is mixed with existing fuels 61 and oil 63. Based upon conventional tank sizes of 123 gallons between the two tanks 62 and 64, it is preferable that the pump 74 is sized to filter the contents of both tanks every 10 minutes or less. The recirculation prevents separation of fuel and waste oils and continuously polishes the fuel during engine operation. The addition of fuel, whether it be waste oil or diesel fuel, is quickly blended for immediate use. A container 104 is provided for the filtration system allowing placement on the side rail of a heavy duty truck tractor, the gauges 80 and 94 extending therefrom for monitoring of the filters operation.

The blended fuel directed 97 to the engine and adapted for connection to the injection system 110 wherein the conventional paper filter 106 and 108, used to remove water and provide backup filtration, are replaced with fiberglass filter elements of the instant invention- Unlike paper filters used in the prior art for fuel filtering, the fiberglass filter does not remove the water allowing the highly filtered water to pass into the injection system providing a benefit of carbon removal. It should be noted that in the event of waste oil management system bypass, an improper mixture can reach the injection system 110 wherein the engine will run rich causing black smoke which indicates to the operator the imminent failure of the fuel system.

It is to be understood that while I have illustrated and described certain forms of my invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What I claim is:

1. A fuel management system for blending of alternative fuels with a conventional fuel and the continuous filtration thereof before delivery to the fuel injection system of a diesel engine, said system comprising first storage means for storing therein a supply of liquid fuel;

second storage means for storing therein a supply of liquid fuel;

a pump including an inlet coupled to said first tank by a first conduit and second storage tank by a second conduit, each said conduit having a restriction placed therein allowing a predetermined amount of fuel to flow from each said storage means, said pump having a means for mixing the liquid fuels from each said storage tank into a blended fuel and pressurizing said blended fuel;

fiberglass filtration means for selective non-fluid contaminant reduction from said blended fuel, said fiberglass filtration means including an inlet and an outlet;

means for fluidly connecting the inlet of the fiberglass filtration means to an outlet of said pump;

means for determining filter replacement;

metering means for directing a first portion of said blended fuel to the injection system of the engine and a second portion of said blended fuel directed to said first and second storage means; and means for fluidly connecting an inlet of said metering means to an outlet of said fiberglass filtration means.

2. The fuel management system according to claim 1 wherein said first storage tank houses a supply of conventional diesel fuel and said second storage tank houses a supply of alternative fuel.

3. The fuel management system according to claim 2 wherein said alternative fuel is further defined as waste oil.

4. The fuel management system according to claim 1 wherein said pump for pressurizing said blended fuel is defined as a self-priming air operated diaphragm pump.

5. The fuel management system according to claim 4 wherein said air operated diaphragm pump provides a variable delivery rate by means of a manual air line regulator.

6. The fuel management system according to claim 1 wherein said fiberglass filtration means is further defined as a spin-on canister cartridge having a fiberglass element with a micron rating of less than 25 and greater than zero.

7. The fuel management system according to claim 6 wherein said spin-on canister cartridge is placed in parallel with a second spin-on canister cartridge by means of a single die cast header, each said canister cartridge sealingly secured to said header.

8. The fuel management system according to claim 6 wherein said fiberglass element is pleated.

9. The fuel management system according to claim 6 wherein said spin-on canister cartridge is disposable.

10. The fuel management system according to claim 6 wherein said fiberglass filtration means is comprised of two filtration units connected in series, each said unit comprising two spin-on canister cartridges coupled to a single die cast header filtering fuel in a parallel configuration.

11. The fuel management system for blending waste oil with diesel fuel and the continuous filtration thereof before delivery to the fuel injection system of a conventional diesel engine, said system comprising first storage means for storing therein a supply of conventional diesel fuel, said first storage means having a means for restricting the amount of diesel fuel deliverable therefrom;

second storage means for storing therein a supply of waste oil, said second storage means having a means for restricting the amount of waste oil deliverable therefrom;

a self-priming variable delivery air operated diaphragm pump having a first and second inlet and an outlet, said first inlet coupled to said means for restricting of fuel flow from said first storage tank by a first conduit, said second inlet coupled to said means for restricting oil flow from said second storage tank by a second conduit, said pump including means for blending said diesel fuel with said waste oil to form blended fuel oil;

at least two fiberglass filters for contaminant reduction of said blended fuel oil said filters disposed in a parallel arrangement using a single die cast head having at least one bypass valve, said die cast head including an inlet and an outlet;

means for fluidly connecting the inlet of said head to an outlet of said pump;

means for determining filter replacement;

metering means for directing a first portion of said blended fuel oil to the injection system of the engine and a second portion of said blended fuel oil directed to said first and second storage means;

means for fluidly connecting an inlet of said metering means to an outlet of said head;

polishing fiberglass filtration means interposed between said metering means and said fuel injection system for filtering said first portion of said blended fuel; and a mounting means for mounting said diaphragm pump and said filtration means in alignment with said fuel injection system.

12. The fuel management system according to claim 11 wherein said bypass valve includes a spring means to maintain said valve in a closed position at pressures less than 15 psi.

13. The fuel management system according to claim 11 wherein said means for determining filter replacement is comprised of a first pressure gauge mounted on the inlet to said head and a second pressure gauge mounted on the outlet of said head for viewing differential pressure thereon.

14. The fuel management system according to claim 11 wherein said mounting means is defined as an enclosure secured to a side rail of a truck tractor wherein said means for determining filter replacement is displayed thereon.

15. The fuel management system according to claim 11 wherein said die cast head includes a $1\frac{1}{2}$ inch inlet and a $1\frac{1}{2}$ inch outlet.

* * * * *